United States Patent [19]

Gueugnon et al.

[11] Patent Number: 4,666,789

[45] Date of Patent: May 19, 1987

[54] MAGNETO-OPTIC RECORDING MEDIUM

[75] Inventors: Catherine Gueugnon, Paris; Pierre Bernstein, Meudon, both of France

[73] Assignee: Cii Honeywell Bull (Societe Anonyme), Paris, France

[21] Appl. No.: 705,917

[22] Filed: Feb. 26, 1985

[30] Foreign Application Priority Data

Feb. 29, 1984 [FR] France .................................. 84 03113

[51] Int. Cl.$^4$ .............................................. G11B 7/24
[52] U.S. Cl. ..................................... 428/611; 428/668; 428/680; 428/681; 428/694; 428/900; 428/928
[58] Field of Search ............... 428/652, 694, 900, 928, 428/611, 655, 668, 680, 681; 365/122; 360/131, 135

[56] References Cited

U.S. PATENT DOCUMENTS 4,525,028 6/1985 Dorschner ........................... 350/377
4,569,881 2/1986 Freese et al. ........................ 428/900

OTHER PUBLICATIONS

Mansuripur et al., "Optimum Disk Structures...", IEE Trans, of Mag., vol. MAG 18, Nov. 1982, p. 1241.
Cuomo et al.; IBM Tech. Bull., vol. 16, No. 5, Oct. 1973, p. 1442.
Takahashi et al., "Magneto-Optic Properties of GdTbFe Thin Films", Nov. 1983.
Katayama et al., "Study of High Reliability of the Magneto-Optic Medium with the Multilayer Structure", Nov. 1983.
Bartolini et al., "Optical Disk Systems Emerge", IEEE Spectrum Aug. 1978, p. 20.
Stoffel; "Thin Film Magneto-Optic Read-Write Memory Element", IBM Tech. Dis. Bull., vol. 12 (1), 6/69, p. 209.

Primary Examiner—Marion C. McCamish
Assistant Examiner—William M. Atkinson
Attorney, Agent, or Firm—Kerkam, Stowell, Kondracki & Clarke

[57] ABSTRACT

A multilayer magnetic recording medium including at least one magnetic layer (CMOI) formed of an alloy including one of the group of heavy rare earths and a metal of the group of the first series of transition metals surrounded by at least two dielectric layers.

According to the invention, the magnetic medium is characterized in that it includes means for preventing the diminution of the number of atoms of rare earth participating in the magnetism of the magnetic layer disposed on both sides of the magnetic layer.

Applicable to magnetooptic disks.

5 Claims, 13 Drawing Figures

MAGNETO-OPTIC RECORDING MEDIUM

The present invention relates to a magneto-optic recording medium. More particularly, it is applicable to magneto-optic disk memories.

Disk memories are being used to an increasing extent in information processing systems.

In these systems, the data are carried by magnetic disks and are contained in the interior of concentric circular recording tracks. The data appear in the form of a succession of small magnetic zones distributed over the entire length of the track and which have magnetic inductions of the same modulus but opposite directions.

The current trend in the development of disk memories is to increase both the longitudinal and the radial density of the data (the longitudinal density is the number of data per unit of length, measured along the circumference of a track, while the radial density is defined as the number of tracks per unit of length measured along the diameter of the disk). To this end, magnetic disk memories are very promising, since the radial and longitudinal densities obtained are on the order of 10,000 tracks per centimeter radially and 10,000 data per centimeter longitudinally.

In magneto-optic memories, writing is effected either by using magnetic transducers generally comprising a magnetic circuit about which a winding is disposed and which includes an air gap, or by using a thermomagnetic mode of writing; the principle of such a mode of writing is explained, for instance, in French Pat. No. 2.514.913, filed by the Compagnie Internationale pour l'Informatique CII Honeywell Bull on Oct. 16, 1981, the inventor of which is Mr. Jean-Pierre Lazzari.

Reading is effected by an optoelectronic device including a set of optical means and photoelectronic transducers associated with electronic circuits, the transducers transforming the light they receive into an electrical signal. In other words, magneto-optic memories are memories where the information is carried by magnetic disks and is read by optoelectronic devices.

The magnetic recording medium has magneto-optical properties; the materials having magneto-optic properties, and the Faraday and Kerr effects, will be discussed below.

Among the materials having magneto-optic properties are, in particular, alloys including a metal of the first series of transition metals, e.g., Fe, Ni, and one of the metals of the heavy rare earth group, such as terbium, or gadolinium, or dysprosium. These materials and their magneto-optic properties are described, for instance, in the article entitled "Magnetic and magnetooptic properties of amorphous Gd-Fe-Bi films" by P. Hausen and M. Urner-Wille, Journal of Applied Physics 50 (11), November 1979, pages 7471–7476. For any material of this type, and more generally for any material having magneto-optic properties, the magneto-optic effect resides in the principle of the interaction of a linearly polarized light with the magnetic state of the material. If this interaction takes place via transmission of the light through the material, the magneto-optic effect is called the Faraday effect, while if it takes place by reflection, the magneto-optic effect is called the Kerr effect.

It will be recalled that light is polarized in a linear manner when the electrical field vector always maintains the same direction in the plane perpendicular to the direction of radiation propagation, the plane of polarization being defined as the plane containing the direction of propagation of the light and the electrical field vector.

The interaction of linearly polarized light with the magnetic state of the material comprising the magnetic recording medium of the magneto-optic memory consequently results in the rotation of the electrical field vector in the plane perpendicular to the direction of propagation.

It will be observed that after having passed through the magnetic material comprising the magnetic recording medium (in the case of the Faraday effect) or after having been reflected by the magnetic material (in the case of the Kerr effect), the electrical field vector of the polarized light undergoes a rotation, conventionally said to be equal to an angle $-\theta$, when the light encounters a zone where the magnetization of the medium is in a first direction, while this rotation is equal to an angle $+\theta$ when the polarized light encounters a magnetic zone where the magnetization is in a second direction (opposite from the first direction).

To read the information recorded on a magnetic recording medium having magneto-optic properties, it is sufficient to detect the direction of rotation of the electrical field vector. (This enables the recognition of the direction of the magnetization in the magnetic zone encountered by the linearly polarized light.)

To do this, the optoelectronic means mentioned above include an optical system having a light analyzer, which is also described in the above-mentioned French Pat. No. 2.514,913. The light analyzer is disposed such that when the electrical field vector undergoes a rotation $(-\theta)$, the signal furnished by the optoelectronic means has a zero voltage, for example, while in the case where the electrical field vector has undergone a positive rotation $(+\theta)$, the signal furnished by the optoelectronic means has a voltage that is not zero.

For any magnetic material having magneto-optic properties, a variable known as a figure of merit F is defined such that $$F = R \times (\sin 2\theta)^2,$$

wherein R is the reflection factor of the material (that is, the percentage of radiation which is reflected by the material having the magneto-optic properties), and $\theta$ is the angle of rotation of the electrical field vector, as defined above.

It has been found that the higher this figure of merit, the higher the signal-to-noise ratio of the optoeletronic reading device becomes.

Magnetic recording media having magneto-optic properties in which the figure of merit is high are known. Such media are described, for instance in the article by G. A. N. Connel, R. Allen and M. Mansuripur, of the research center of the Xerox company in Palo Alto, U.S.A., entitled "Interference enhanced Kerr spectroscopy for very thin absorbing films-applications to amorphous terbium iron", published in the Journal of Magnetism and Magnetic Materials, No. 35, 1983, by North Holland Publishing Company.

One such medium having magneto-optic properties is multilayered. It includes, in succession, a reflecting layer, generally of metal, disposed on a substrate; a first dielectric layer; a layer of magnetic material having magneto-optic properties, that is, an alloy preferably including iron or cobalt and a heavy rare eargh such as terbium or gadolinium; and a second dielectric layer. The first and second dielectric layers very frequently comprise an oxide of silicon, having either the chemical formula $SiO_2$ or the chemical formula SiO, because this oxide is inexpensive and has a high coefficient of transparency to light.

The first dielectric layer makes it possible to create an optical system producing interference, as will be explained hereinafter, while the second dielectric layer is a protective layer, making it possible to prevent the oxidation of the magnetic layer having the magneto-optic properties, once that layer has been deposited.

The thickness of the layers is on the order of a few tens of angstroms to a few hundred angstroms and may even reach one to two thousand angstroms.

The magnetic layer is anisotropic, and its axis of easy magnetization is perpendicular to its surface. Thus the magnetization in the magnetic layer is likewise perpendicular to the surface thereof.

If one considers an incident beam of linearly polarized light aimed in a direction going from the second dielectric layer to the reflective layer, it will be found that this bundle of light splits into several parts (as will be explained in detail hereinafter, in conjunction with FIG. 2), and the electrical field vector of each of these parts undergoes a rotation, either solely by the Kerr effect or solely by the Faraday effect or by a combination of the two.

These different parts, having the same wavelength, travel different optical routes. They are reunited as they emerge from the recording medium, at the surface of the second dielectric layer in contact with the air (it is assumed that the multilayer recording medium is in contact with the air via the surface of the second dielectric layer), in the form of light interference.

In the above-cited article, the authors indicate that the rotation of the electrical field vector of the reflected beam, reunited in the form of light interference, is much greater than if only a single magnetic layer is used, in the absence of reflective and dielectric layers. This is due to the combination of the Kerr and Faraday effects in the interior of the multilayer recording medium interference.

In the above-cited article, the authors also indicate that as a function of both the wavelength of the beam of incident light and the thickness of each of the layers, the reflection factor and the angle of rotation of the electrical field vector $\theta$ vary in opposite directions. Thus for a given wavelength, one must determine the thicknesses of each of the layers constituting the recording medium, such that the figure of merit will be maximal.

The magnetic recording medium such as those described above have the following major disadvantage:

It has in fact been found that the magnetic properties of the multilayer magnetic recording medium do not remain constant over time. In particular, depending on whether the initial content X (also known as the initial composition) of rare earth, in the iron/rare earth alloy constituting the magneto-optic layer that is part of the multilayer recording medium such as that described above, is less or greater than a value determined for each alloy individually, known as the composition of compensation $X_{comp}$, the following phenomena are observed:

if $X < X_{comp}$, the coercive field $H_c$ of the magnetic recording medium diminishes with time, while if $X > X_{comp}$, the coercive field $H_c$ increases with time.

This observed phenomenon is extremely inhibiting, because the coercive field of the magnetic recording medium must remain within certain limits, for example between 500 and 1000 oersteds.

In the case where the coercive field increases with time, its value rapidly becomes greater than this value of 1000 oersteds. It and it becomes extremely difficult, with writing means in current use, to produce magnetic fields greater than this coercive field, which makes writing more and more difficult as time passes.

Conversely, if the coercive field diminishes with time and becomes less than 500 oersteds, the magnetic recording means becomes sensitive to the external parasitic magnetic field, and both reading and writing may be affected thereby. The error rate, both in writing and in reading, thus becomes quite high.

The present invention makes it possible to overcome these disadvantages and to keep the magnetic properties of the magnetic recording medium constant over time. This is attained by disposing, on both sides of the magneto-optic layer, which is made of an alloy of iron or cobalt and a heavy rare earth, means for preventing any diminution of the number of atoms of rare earth participating in the magnetism of the magneto-optic layer.

According to the invention, the multilayer magnetic recording medium, includes at least one magnetic layer formed by an alloy of a metal of the first series of transition metals and a metal of the group of heavy rare earths, surrounded by at least two dielectric oxide layers, and is characterized in that it includes means for preventing any diminution of the number of atoms of rare earth participating in the magnetism of the magnetic layer, disposed on both sides of this magnetic layer.

According to a preferred embodiment of the invention, the above means comprise at least two layers of metal of the group of heavy rare earths, each of which is disposed between the magnetic layer and one of the dielectric oxide layers.

The rare earth metal layers frequently, but not necessarily, comprise the same metal as that included in the composition of the magnetic layer (Gd, Tb, Dy, Ho, etc.).

Further characteristics and advantages of the present invention will become apparent from the ensuing description, given by way of non-limiting example and taken in conjunction with the appended drawings.

For the sake of better comprehending how the magnetic recording medium having magnetooptic properties according to the invention is constituted and functions, some review of magnetic recording media having magnetooptic properties according to the prior art will be useful. This review will illustrate, first, the constitution and function of a magnetic recording medium according to the prior art, referring to FIGS. 1 and 2, and, second, how such a medium according to the prior art does not keep its magnetic properties constant over the course of time, as shown by FIGS. 3-6.

Figure 1:
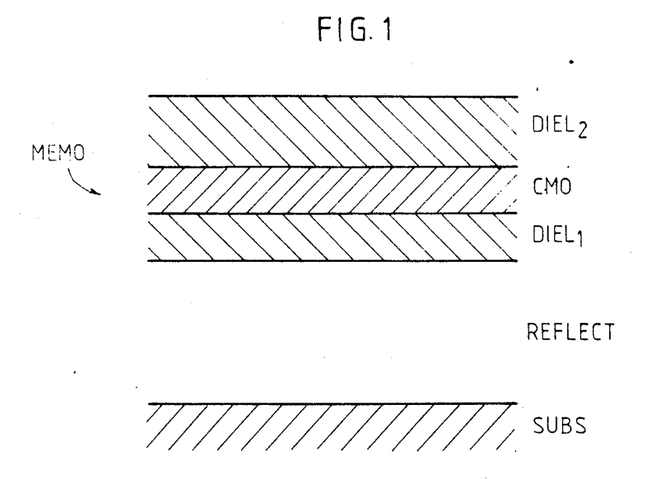
FIG. 1 shows a multilayer magnetic recording medium according to the prior art.
Figure 2:
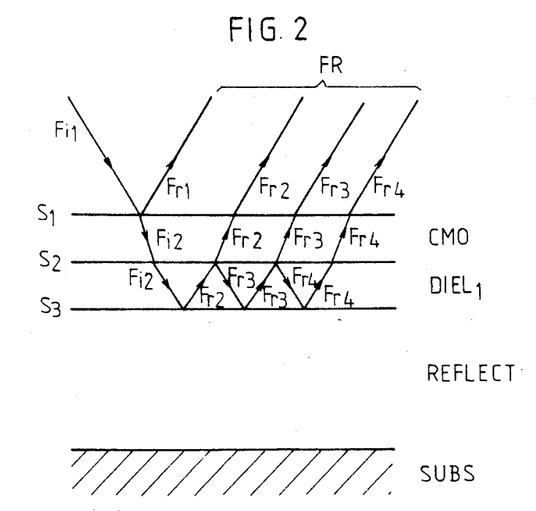
FIG. 2 illustrates the function of the magnetic recording medium according to the prior art shown in FIG. 1.

FIGS. 1 and 2 will be considered first.

As shown in FIG. 1, the magnetic recording medium having magnetooptic properties according to the prior art, identified in the drawing as MEMO, includes the following:

a substrate SUBS, preferably of nonmagnetic insulating material;

a light reflecting layer REFLECT, preferably realized by a metal material such as aluminum;

a first dielectric layer $DIEL_1$, realized in a nonmagnetic material, such as one of the oxides of silicon, $SiO_2$, SiO;

a magnetic layer CMO having magneto-optic properties, preferably realized by an alloy of iron or cobalt and a metal of the heavy rare earth group, such as terbium or gadolinium or dysprosium; and a second dielectric layer $DIEL_2$, preferably realized by the same material as the first dielectric layer $DIEL_1$.

The thickness of the two dielectric layers $DIEL_1$ and $DIEL_2$ is on the order of a few hundred angstroms. Similarly, the thickness of the magneto-optic layer CMO is preferably on the order of 100 to 300 angstroms.

The thickness of the layers $DIEL_1$, $DIEL_2$ and CMO is sufficiently slight that the coefficient of light transmission of each of them is not negligible.

As has been noted above, the dielectric layer $DIEL_1$ is deposited on the reflective layer REFLECT, immediately after that layer has been deposited on the substrate SUBS, in order to create an interferential optical system. (See also below, referring to FIG. 2.).

The dielectric layer $DIEL_2$ is deposited immediately after the deposition of the magneto-optic layer CMO, such as to prevent any later oxidation of that layer.

In current practice, the rare earth content X in the alloy comprising the magneto-optic layer CMO is between 10 and 40%. It will be remembered that the rare earth content X (also known as the alloy composition) is the percentage of atoms of rare earths contained in the alloy with respect to the total number of atoms contained therein. Thus a content X of 20% signifies that for 100 atoms of alloy, there are 20 atoms of rare earth and 80 atoms of iron (or cobalt).

The function of the magnetic recording medium of FIG. 1 is particularly shown in FIG. 2. Here a beam of incident linearly polarized light $F_{i1}$ is shown. This beam splits into two parts, that is, a ray $F_{i2}$ which passes through the layer CMO and a ray $F_{r1}$ which is reflected by the surface $S_1$ of the layer CMO. The electrical field vector of this ray $F_{r1}$ has undergone a Kerr effect rotation $\theta_k$ with respect to the electrical field vector of the incident beam $F_{i1}$.

In like manner, the electrical field vector of the ray $F_{i2}$ undergoes a rotation of an angle $\theta_F$ by the Faraday effect, with respect to the direction of the electrical field vector of the incident beam $F_{i1}$.

The beam $F_{i2}$ passes through the surface $S_2$ (in the direction of propagation going from CMO to $DIELI_1$. There is practically no reflection by the surface $S_2$, since the coefficient of reflection is very low) and it is reflected by the surface S3 of the reflective layer REFLECT, thus becoming the beam $F_{r2}$, which divides into two parts upon arriving at the surface $S_2$. One part passes through this surface and continues to be known as $F_{r2}$, and the other is reflected by the surface and becomes $F_{r3}$ (in the direction of propagation going from $DIELI_1$ to CMO, the coefficient of reflection is not negligible).

The electrical field vector of $F_{r2}$ has thus undergone a Faraday rotation $\theta_F$, while that of $F_{r3}$ has undergone a Kerr rotation $\theta_k$.

It is clear that the ray $F_{r3}$ can split again, at the surface $S_2$, into two parts. The part which is reflected by this surface $S_2$ then again strikes the surface of the reflector REFLECT and undergoes reflections and transmissions by and through the surfaces $S_2$ and $S_3$ of the same type as those which have been described for the rays $F_{i2}$ and $F_{r2}$.

As shown, beginning with the incident beam $F_{i1}$, a series of rays is obtained: $F_{r1}$, $F_{r2}$, $F_{r3}$, $F_{r4}$, etc. Having undergone a varying number of reflections and transmissions by and through the surfaces $S_2$, $S_2$, $S_3$, their electrical field vectors having undergone a variable number of rotations by the Faraday effect or the Kerr effect. These various rays are recombined into one ray $F_R$, in the form of light interference. One also observes, as the authors Connel, Allen and Mansuripur mentioned above have done, that the total rotation of the electrical field vector of the ray $F_R$ is very much greater than the rotation this same electrical field vector would have if the light ray $F_{i1}$ were to encounter a magnetic recording medium composed of the single magneto-optic layer CMO deposited directly onto the substrate SUBS. Thus as has been noted above, a pronounced rotation and a high factor of reflection of the electrical field vector make it possible to obtain a better signal-to-noise ratio of the optoelectronic devices for reading the magnetic information contained in the recording medium MEMO.

Figure 3:
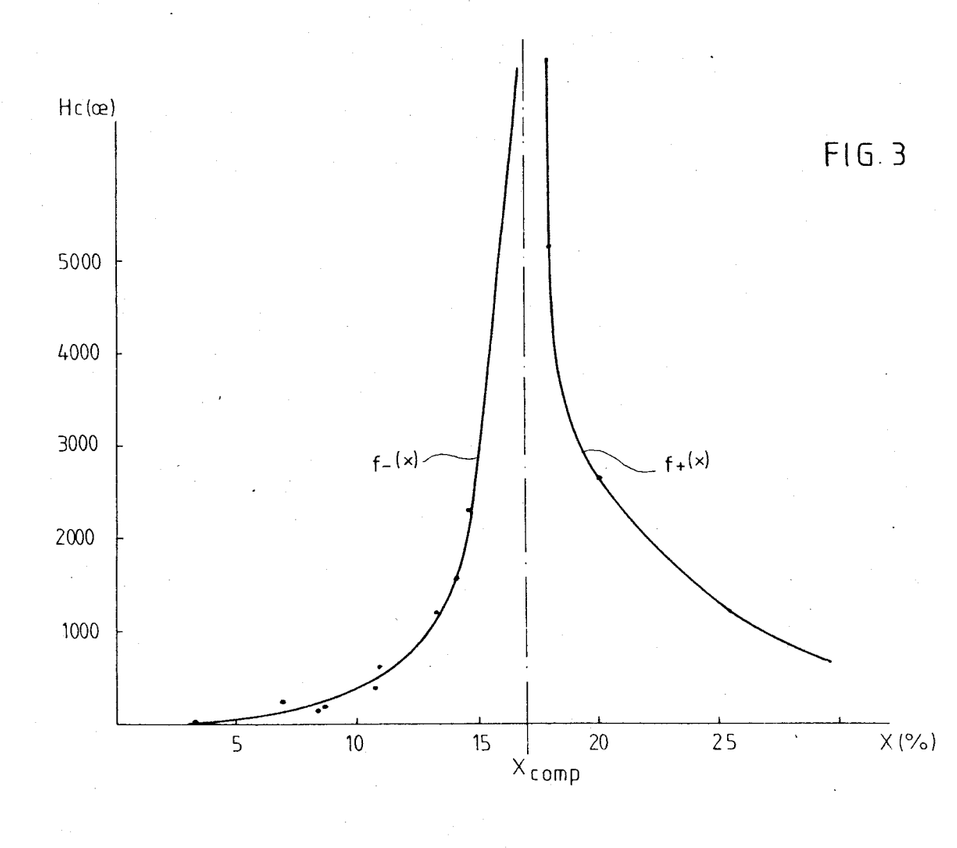
FIG. 3 shows the curve indicating the variation of the coercive field of the magnetic recording medium according to the prior art for a given thickness of the magneto-optic layer included in its composition, as a function of the rare earth content in the alloy comprising the magneto-optic layer.

FIG. 3 will now be considered, which shows the curve of the variation of the coercive field $H_c$ as a function of the composition of the alloy comprising the magneto-optic layer CMO. The curve in FIG. 1 has been plotted for a magneto-optic layer CMO thickness equal to 2000 angstroms and at a time immediately after the manufacture of the recording medium MEMO.

Figure 6:
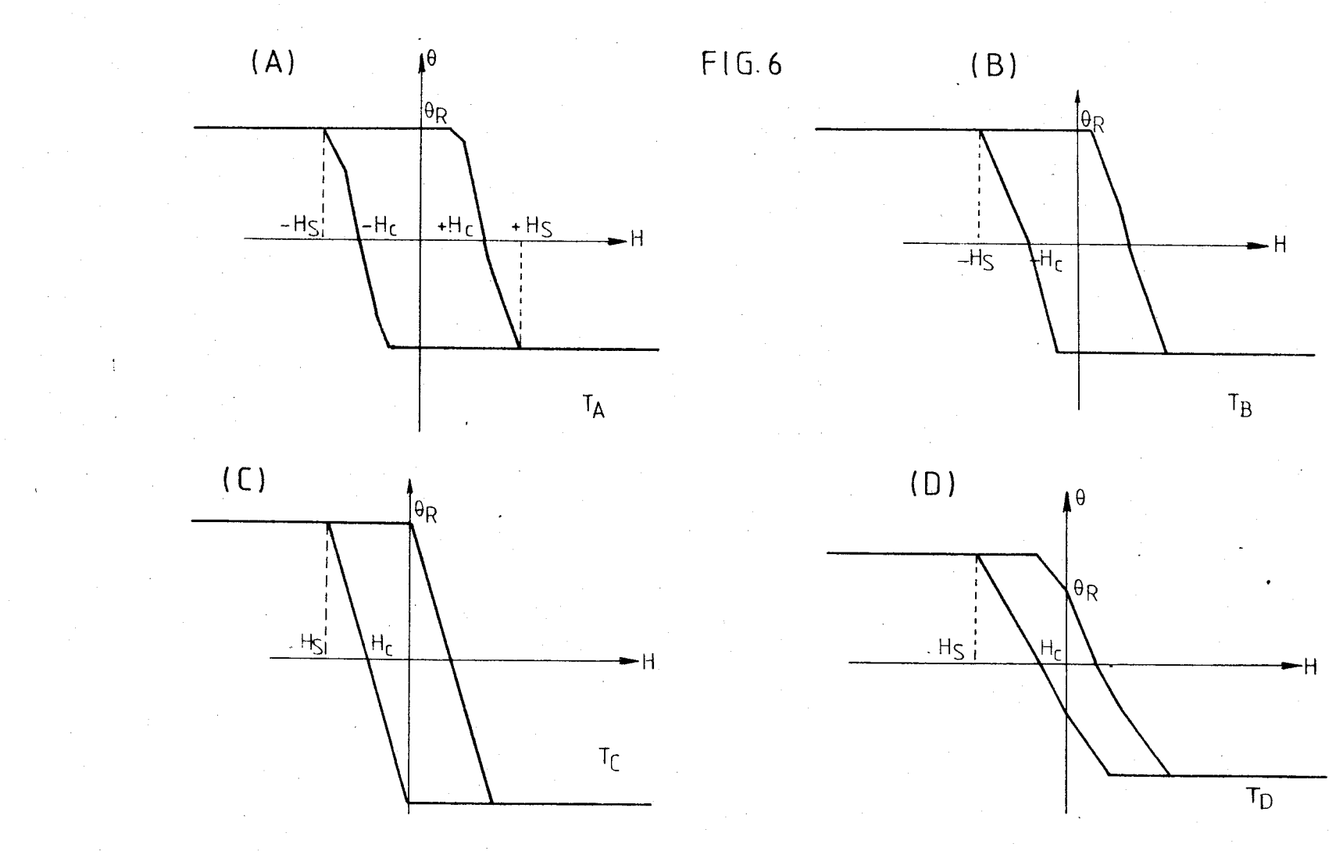
FIGS. 6A–D show how the cycle of magneto-optic hysteresis of the magnetic recording medium becomes less and less rectangular over the course of time, which causes the severe diminution of the magnetic recording medium anisotropy, of the remanent rotation θ, and consequently of the signal for reading the recorded information.

It should be noted that the coercive field measured here is the coercive field known as the magneto-optic coercive field. This is obtained based on the magneto-optic hysteresis cycle of the recording medium MEMO. This cycle is obtained as follows: Linearly polarized light is directed normal to the surface of the magnetic recording medium, that is, parallel to the axis of easy magnetization of the magneto-optic layer CMO, and the rotation $\theta$ of the electrical field vector of the reflected beam $F_R$ that is collected is measured with respect to the direction of the electrical field vector of the incident beam $F_{i1}$, as a function of the magnetic field H applied to the magnetic recording medium along this direction that is perpendicular to the surface of the recording medium. A cycle of hysteresis is thus obtained which takes the form shown in FIG. 6A, for example. It will be remembered that the coercive field (called the magneto-optic coercive field) is the value of H at which the rotation $\theta$ is zero. The value of $\theta$ obtained for H=0 is called the remanent rotation $\theta_r$. FIG. 6 shows that the form of the hysteresis cycle $\theta_{(H)}$ is analogous to that of a classical magnetic hysteresis cycle B (H), where B is the magnetic induction. For this latter, one obtains a coercive field $H'_c$ (for which the induction B becomes zero), the coercive field $H'_c$ being in the vicinity of $H_c$, that is, the magneto-optic coercive field.

Returning to FIG. 3, it will be seen that the curve $H_c=f(X)$ is broken down into two curves, that is, $f-(X)$ and $f+(X)$.

The first curve $f-(X)$ is obtained for the values of X less than a composition known as the compensation composition $X_{comp}$, at which the magneto-optic coercive field $H_c$ has a very high value, one practically impossible to measure. It will be seen that the curve $f-(X)$ is one which increases as a function of X.

Conversely, the curve $f+(X)$ obtained for the values of X greater than $X_{comp}$ decreases as a function of X.

Figure 4:
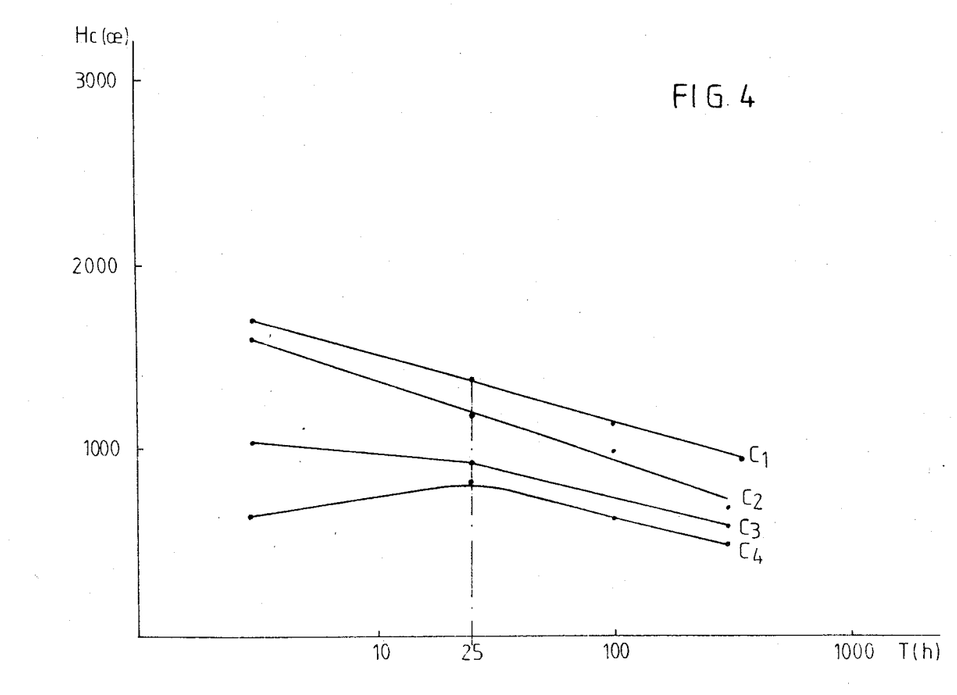
FIG. 4 is a series of curves indicating the evolution of the coercive field (expressed in oersteds) as a function of time, for various thicknesses of the magneto-optic layer in the iron/rare earth alloy of the magnetic recording medium.

FIG. 4 will now be considered.

This figure shows four curves $C_1-C_4$ of the variation of the magneto-optic coercive field $H_c$ as a function of time T measured in hours; the time T=0 corresponds to the moment when the magnetic recording medium MEMO has just been manufactured. For each of these curves, the initial composition $X_d$, that is, the rare earth content at time T=0, is the same and is less than the compensation composition $X_{comp}$. Each of these curves $C_1-C_4$ is plotted for recording media MEMO where the thicknesses $e_1-e_4$ of the of the magneto-optic layer CMO are different and are, respectively, equal to 300, 250, 200 and 150 Å. These media MEMO comprise an alloy of iron and terbium where X=14.5% for the terbium (85.5% for the iron).

It will be seen that at the end of a time T equal to approximately 25 hours, the decrease in $H_c$ is rather rapid, while at approximately 300 hours the field $H_c$ has lost approximately one-third of the value it had at the end of 25 hours.

Figure 5:
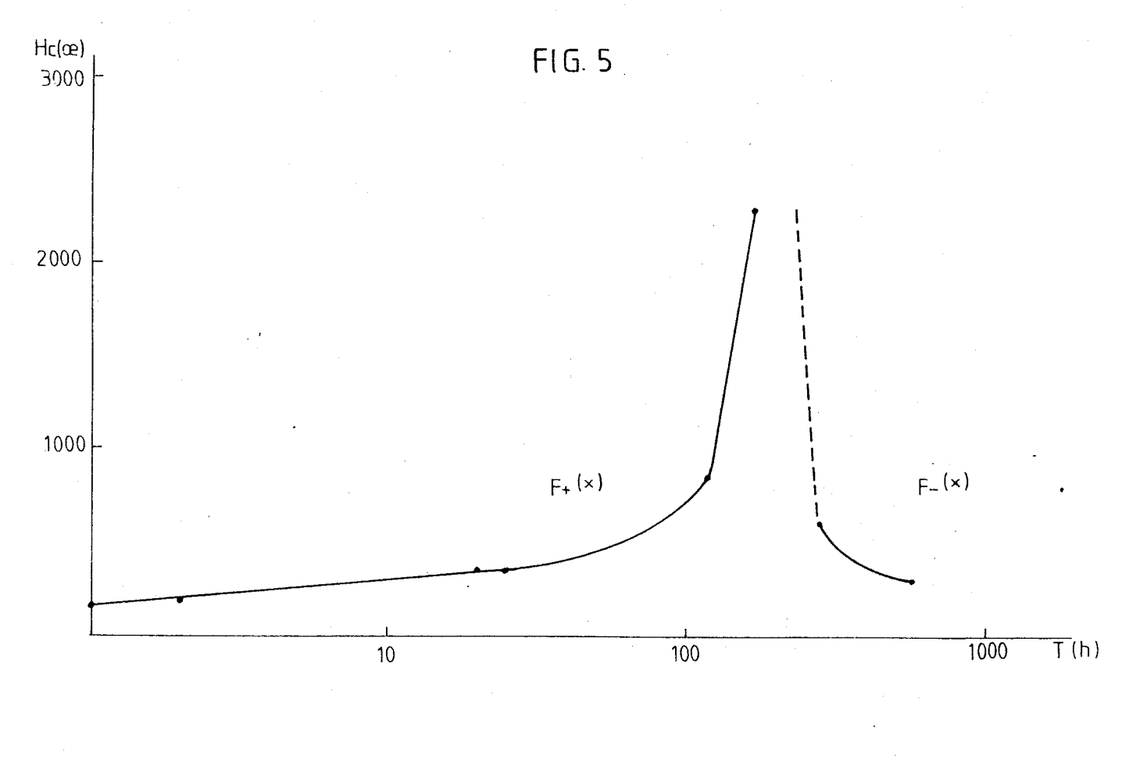
FIG. 5 shows the evolution over the course of time of the coercive field of a magnetic recording medium where the initial content X of rare earth in the alloy constituting the magneto-optic layer is greater than the composition of compensation.

FIG. 5 will now be considered. It shows the variation of the coercive field $H_c$ as a function of time for a magnetic recording medium MEMO equal to 2000 Å, having an initial composition $X_d$ greater than the compensation composition $X_{comp}$. This figure includes two curves $F+(X)$ and $F-(X)$, the first being a function that increases with time and the second being a function that decreases with time. For a certain value of time, the coercive field is very large, one that becomes impossible to measure.

Returning to FIG. 6, which shows four magneto-optic hysteresis cycles of the magnetic recording medium MEMO of Fe-TB at different instants $T_A$, $T_B$, $T_C$, $T_D$, with $T_A$ less than $T_B$, which is less than $T_C$, which is less than $T_C$. The instant $T_A$ is close to the instant when the medium MEMO has been produced, at which the composition X of terbium is less than the compensation composition and its thickness is 250 Å.

It will be noted that the coercive field diminishes as a function of time (the scales for $\theta$ and H are the same for each of the four cycles A, B, C, D shown). It will also be noted that the cycle becomes narrower and its rectangularity decreases, which signifies that the magnetic anisotropy of the recording medium decreases as well; it is in fact apparent that the ratio $H_c/H_S$ decreases proportionately as time passes, $H_S$ being the field of saturation. It will further be noted that the form of the observed hysteresis cycle approaches nearer and nearer to that of the hysteresis cycle along an axis of difficult magnetization as time passes.

In comparing FIGS. 3, 4 and 5, it can be concluded that the composition of the alloy comprising the magneto-optic layer is modified over the course of time, with the apparent content of the metal of the rare earth group decreasing over time. In other words, this signifies that the number of atoms of rare earth in the magneto-optic layer decreases with time, a phenomenon which may be due either to a migration of rare earth atoms to the dielectric layers because these atoms have an affinity with the oxygen atoms in the dielectric layer, or to a migration of the oxygen atoms contained in the dielectric layer to the magneto-optic layer, accompanied by the oxidation of the atoms of rare earth in the magneto-optic layer, or finally to a simultaneous occurrence of both these types of migration.

FIGS. 3 and 4, and more particularly the curve $f-(X)$, will now be compared with the set of curves $C_1-C_4$ of FIG. 4. In FIG. 4, the initial composition is less than the compensation composition, and the coercive field decreases as a function of time. Referring to the curve $f-(X)$ in FIG. 3, it is apparent that beginning with an initial composition X less than $X_{comp}$, if the composition decreases then the coercive field decreases.

Similarly, with respect to the curve $f+(X)$ of FIG. 5, beginning with an initial composition $X_d$ greater than $X_{comp}$ the coercive field increases until at the end of a predetermined period of time it attains a very high value which is impossible to measure. Now if the curve $f+(X)$ of FIG. 3 is considered, it will be noted that beginning at a value for X greater than $X_{comp}$, if the composition X decreases, the coercive field $H_c$ greater until it attains a very high value, one impossible to measure, at a value of $X=X_{comp}$.

This analysis is also corroborated by experience, since analysis of the physical and chemical composition of the recording medium MEMO at the end of a certain period after the production of this medium has shown a high concentration of rare earth atoms at the surfaces $S_1$ and $S_2$ (see FIG. 2). This decrease in the active rare earth atoms participating in the magnetism of the magneto-optic layer is due to the above-mentioned migration phenomena.

Figure 7:
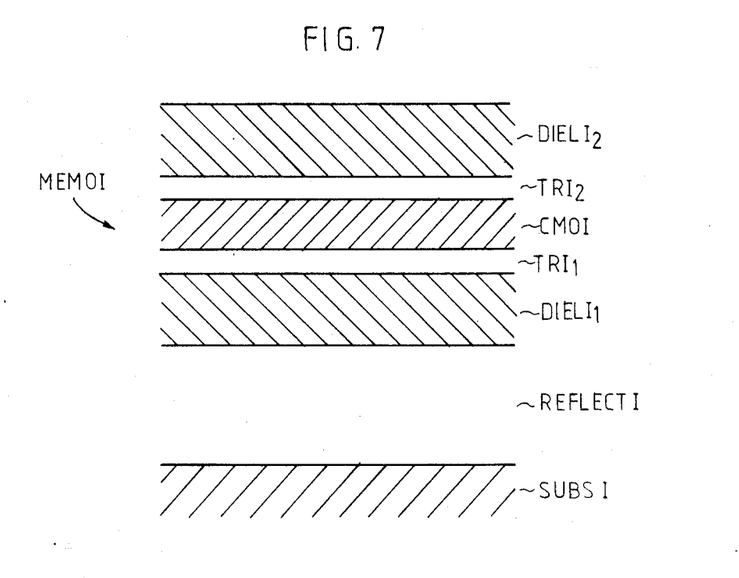
FIG. 7 shows the magnetic recording medium according to the invention.

The recording medium MEMOI according to the invention and shown in FIG. 7 makes it possible to overcome these disadvantages by blocking both the migration of the rare earth atoms to the dielectric layers and the migration of the oxygen atoms to the magnetic layer. This is accomplished by introducing a thin layer of heavy rare earth (on the order of a few tens of angstroms) between the magneto-optic layer and the two dielectric layers surrounding it. These two layers of rare earth thus constitute the means for preventing the decrease in the number of atoms of rare earth participating in the magnetism of the magnetic layer.

Thus as shown in FIG. 7, the magnetic recording medium MEMOI according to the invention comprises a substrate SUBS I; a reflective layer REFLECT I; a first dielectric layer $DIELI_1$; a first layer of rare earth $TRI_1$; a magneto-optic layer CMOI; a second layer of rare earth $TRI_2$; and a second dielectric layer $DIELI_2$.

As indicated above, the two rare earth layers $TRI_1$ and $TRI_2$ have a thickness of a few tens of angstroms. The dielectric layers $DIELI_1$ and $DIELI_2$, the magneto-optic layer CMOI, the reflective layer REFLECT I and the substrate SUBS I are identical to the dielectric layers $DIEL_1$ and $DIEL_2$, the magneto-optic layer CMO, the reflective layer REFLECT and the substrate SUB of the magnetic medium MEMO off FIG. 1.

Figure 8:
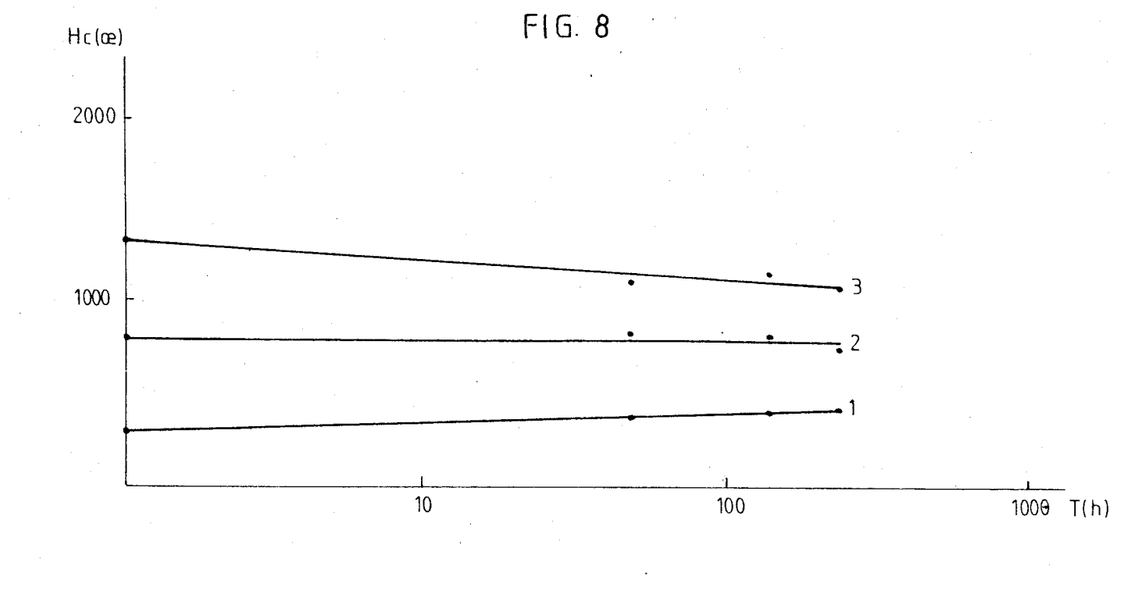
FIG. 8 shows three curves indicating the evolution of the coercive field as a function of time in a magnetic recording medium according to the invention, for three different thicknesses of the layers of rare earth interposed between the magneto-optic layer and the dielectric layers.

FIG. 8 shows three curves 1, 2, 3 indicating the variation of the coercive field $H_c$ of the magnetic medium according to the invention as a function of time, for media MEMOI where the thickness $e_{TRI}$ in the rare earth layers is 20, 30 and 40 Å, respectively, and the thickness of the layer CMOI is 150 Å, for an Fe-Tb alloy where X=14.5 for the terbium. It is apparent that the "aging" of the magnetic recording medium is very perceptibly diminished, even virtually suppressed for the curves 1 and 2, since in these cases the coercive field remains substantially constant as a function of time.

Thus one can see from the appended table (see Appendix 1) that the coercive field $H_c$ and the ratio $H_c/H_S$ (that is, the rectangularity of the cycle, $H_S$ being the field of saturation) both increase as a function of the thickness $e_{TRI}$ of the rare earth layers $TRI_1$ and $TRI_2$. The recording medium selected as a reference for a thickness $e_{TRI}=0$ has been theoretically selected with a maximum aging effect, that is, with a coercive field $H_c$ of zero (this correspondings to an extremely flat hysteresis cycle, analogous to that of the hysteresis cycle along an axis of difficult magnetization).

It has been observed experimentally, from analyses of the physical and chemical composition of each of the layers comprising the magnetic recording medium MEMOI according to the invention, that there is a very pronounced gradient in the concentration of rare earth atoms in the vicinity of each of the rare earth layers $TRI_1$ and $TRI_2$. It may be imagined that a portion of the rare earth atoms migrates from the layers $TRI_1$ and $TRI_2$, some to the magneto-optic layer CMOI and some to the dielectric layers $DIELI_1$ and $DIELI_2$, until an equilibrium is established in the distribution of rare earth atoms, both in the interior of the magneto-optic layer CMOI and in the layers $TRI_1$ and $TRI_2$ and the layers $DIELI_1$ and $DIELI_2$. At the end of a predetermined period, there is a stabilization of the magnetic characteristics of the recording medium MEMOI.

Figure 9:
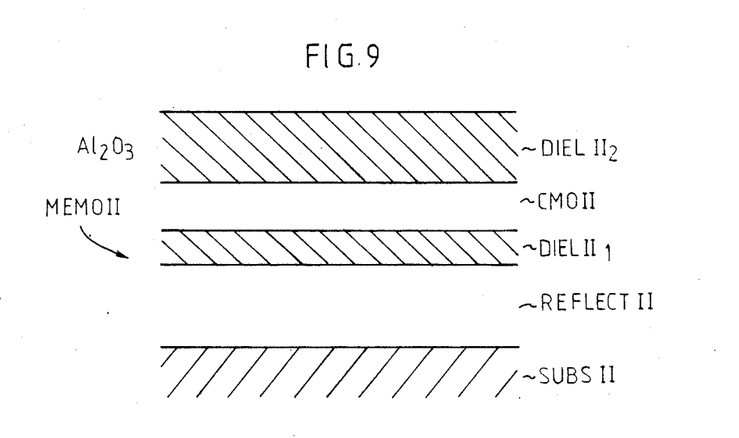
FIG. 9 shows a second embodiment of the invention.

FIG. 9 shows a second embodiment of the invention, where the migration of the rare earth atoms of the magneto-optic layer to the dielectric layers surrounding it has been blocked completely. This is accomplished by replacing the dielectric layers of an oxide of silicon with aluminum oxide layers. It will also be noted that there is a total absence of aging in this magnetic recording medium according to the invention as a function of time; that is, the coercive field remains constant, as does the rectangularity of the magneto-optic hysteresis cycle.

In this second embodiment, it may be said that the aluminum oxide layers comprise the means for preventing the diminution of the number of rare earth atoms participating in the magnetism of the magnetic layer.

The recording medium MEMOII according to the invention shown in FIG. 9 includes a substrate SUBS II; a reflective layer REFLECT II; a first dielectric layer $DIELII_1$; a magneto-optic layer CMOII; and a second dielectric layer $DIELII_2$.

The substrate SUBS II, the reflective layer REFLECT II and the magneto-optic layer CMOII are strictly identical to the substrate, reflective layer and magneto-optic layer of FIGS. 1-6.

The two dielectric layers $DIELII_1$ and $DIELII_2$ are realized of aluminum oxide $Al_2O_3$.

Figure 10:
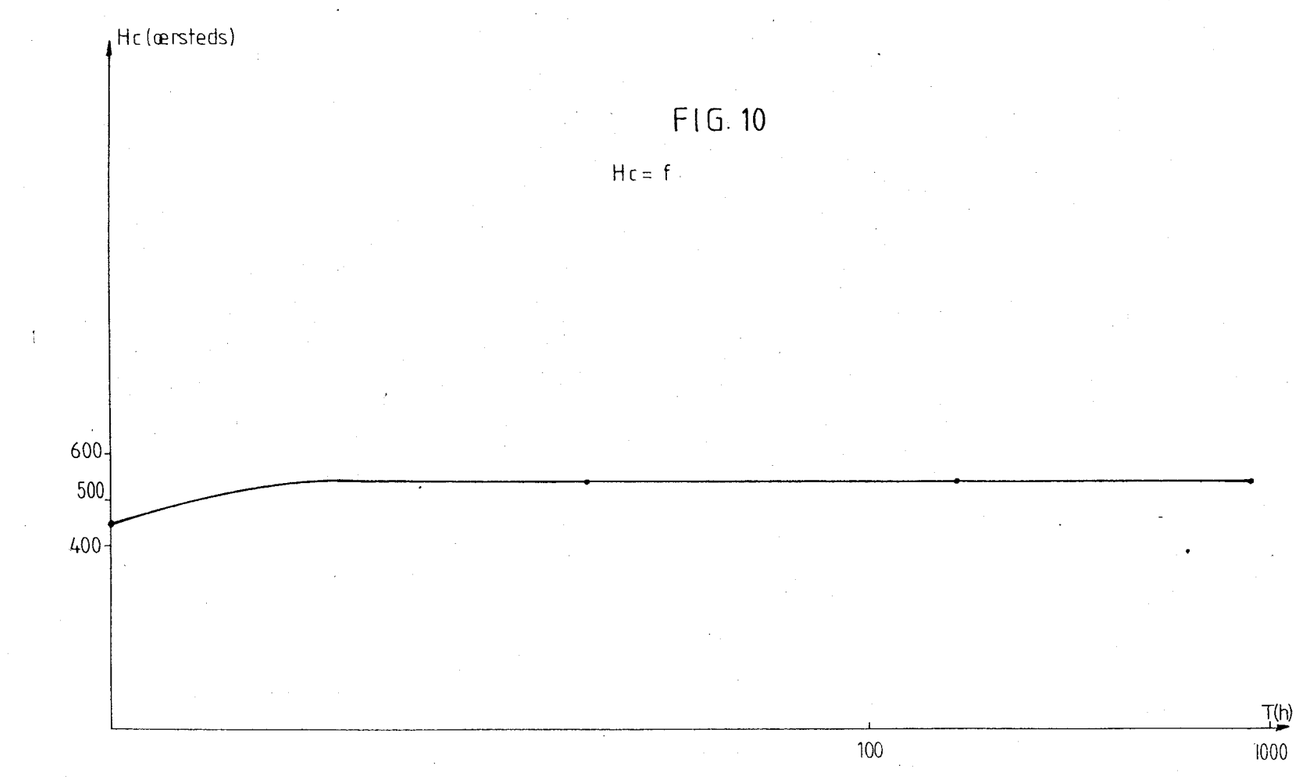
FIG. 10 shows how the coercive field remains constant as a function of time for the second embodiment.

FIG. 10 shows that the coercive field remains rigorously constant over the course of time for the magnetic medium of FIG. 9; the thickness of the aluminum oxide layers is 230 Å for $DIELII_1$ and 910 Å for $DIELII_2$, and the layer CMOI thickness of 200 Å and comprises iron-gadolinum where X=25 for the gadolinum.

It will be understood that a third exemplary embodiment of the invention combining FIGS. 7-9 is possible, that is, a magnetic recording medium analogous to FIG. 7 may be realized in which the dielectric layers $DIELI_1$ and $DIELI_2$ are realized in aluminum oxide, instead of in an oxide of silicon.

APPENDIX 1

| Specimens | Thickness of Tb, in Å | $H_c$, in oersteds | $H_S$, in oersteds | $H_c/H_S$ |
|---|---|---|---|---|
| R | 0 | 0 | 3,400 | 0 |
| 1 | 20 | 300 | 900 | 0.33 |
| 2 | 30 | 900 | 1,400 | 0.64 |
| 3 | 40 | 1,330 | 1,450 | 0.92 |

We claim:

1. A multilayered magnetic recording medium comprising a magnetic layer formed of an alloy of a metal of the heavy rare earth group and a metal of the group of the first series of transition metals, first and second dielectric oxide layers disposed on opposite sides of the magnetic layer, and blocking means disposed on opposite sides of the magnetic layer between the magnetic layer and said dielectric oxide layers for blocking both the migration of rare earth atoms from the magnetic layer to the dielectric oxide layers and the migration of oxygen atoms from the dielectric oxide layers to the magnetic layer, said blocking means comprising first and second blocking layers formed of a metal of the group of rare earths.

2. A multilayered magnetic recording medium according to claim 1, wherein said blocking layers each have a thickness of the order of a few tens of angstroms.

3. A multilayered magnetic recording medium according to claim 1, wherein said alloy is formed of a metal of the heavy rare earth group selected from the group consisting of terbium, gadolinium, and dysprosium, and said metal of the first series of transition metals is selected from the group consisting of iron, cobalt, and nickel.

4. A multilayered magnetic recording medium according to claim 1, further comprising a reflective layer disposed upon a substrate, and wherein one of said dielectric oxide layers is disposed upon said reflective layer.

5. A multilayered magnetic recording medium according to claim 1 wherein said dielectric oxide layers are selected from the group consisting of silicon oxide and aluminum oxide.

* * * * *